Sept. 24, 1957 J. W. JACOBS 2,807,344
CLUTCH FOR REFRIGERATING APPARATUS
Filed July 2, 1953 2 Sheets-Sheet 1

INVENTOR.
James W. Jacobs
BY
His Attorney

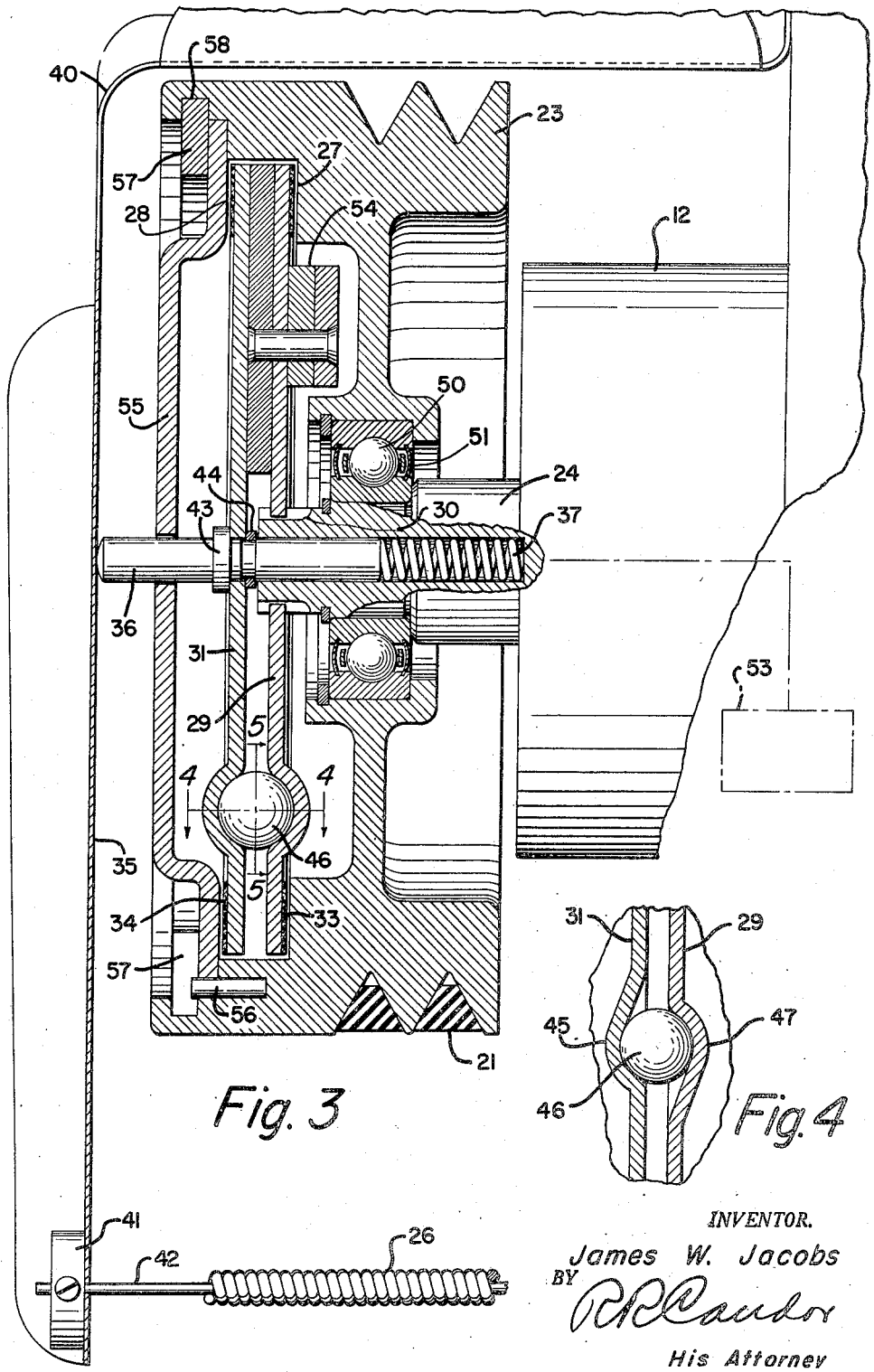

United States Patent Office 2,807,344
Patented Sept. 24, 1957

2,807,344

CLUTCH FOR REFRIGERATING APPARATUS

James W. Jacobs, Dayton, Ohio, assignor to General Motors Corporation, Detroit, Mich., a corporation of Delaware Application July 2, 1953, Serial No. 365,593

10 Claims. (Cl. 192—70)

This application relates to refrigerating apparatus, and more particularly to a clutch for driving the compressor of an automobile air conditioning system.

An object of my invention is to allow the user of an automobile air conditioning system easily to disengage the compressor of the system from the dashboard, thus permitting to discontinue air conditioning, and permitting such disablement to continue for long periods of time during which the user does not desire any air conditioning, this disengagement being accomplished by a clutch which is particularly adapted to accomplish this purpose, and being particularly adapted to be operated by a Bowden wire control from the dashboard, with no parts in wearing operation while the compressor is disengaged.

Another object of this invention is to provide a clutch having a driven shaft, a driving member rotatable about and on the same axis as said driven shaft, said driving member having two inwardly directed drive surfaces, together with two disks having a self-energizing spreader means to engage the disks with the drive surfaces, upon the actuation by the Bowden wire to provide a quickly engageable and disengageable belt drive between the automobile engine and the compressor.

Further objects and advantages of the present invention will be apparent from the following description, reference being had to the accompanying drawings wherein a preferred form of the invention is clearly shown.

In the drawings:

Figure 3 is a further enlarged cross-section taken along the line 3—3 of Figure 2.

Figure 4 is a cross-section taken along the line 4—4 of Figure 3.

Figure 1:
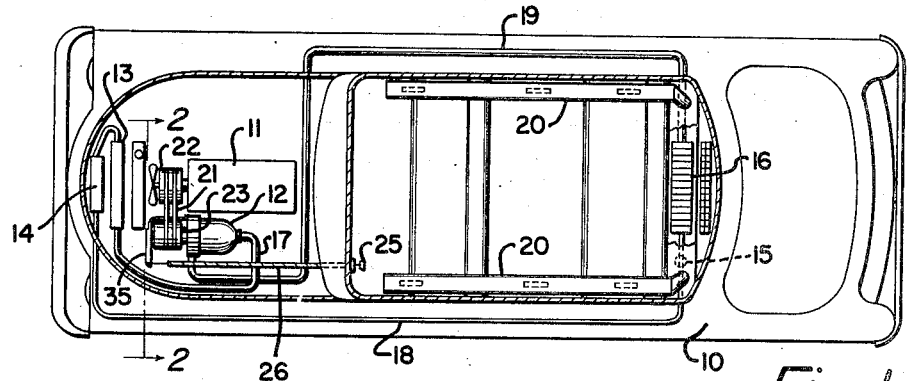
Figure 1 is a diagrammatic representation of an automobile provided with my invention.
Figure 2:
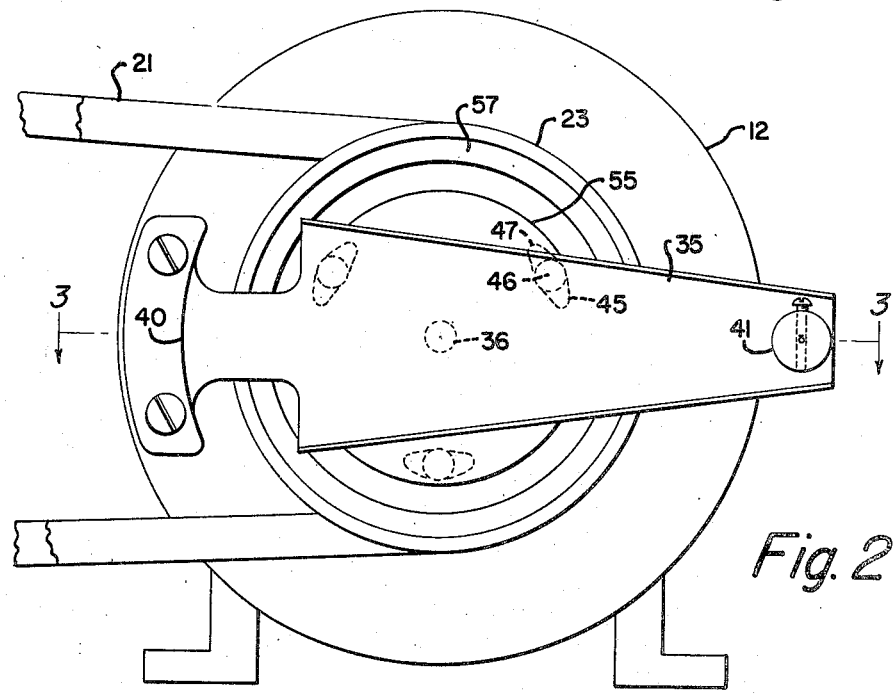
Figure 2 is an enlarged front view taken substantially along the line 2—2 of Figure 1.
Figure 5:
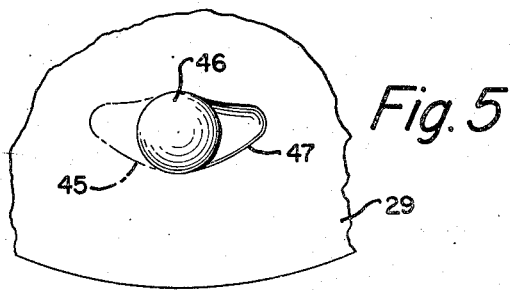
Figure 5 is a cross-section taken along the line 5—5 of Figure 3.

An automobile 10, having an internal combustion engine 11, is provided with an air conditioning system including a compressor 12, condenser 13, receiver 14, expansion valve 15, and evaporator 16 in a closed refrigerant flow cycle. The compressor 12 discharges through the line 17 to the condenser 13 and receiver 14 from whence liquefied refrigerant flows through the refrigerant liquid line 18 to the expansion valve 15 and evaporator 16. The evaporated refrigerant returns through the line 19 to the compressor 12. A suitable fan, not shown, is provided for blowing air past the evaporator 16 to the distributing duct system 20 within the car compartment.

The compressor 12 is driven from the internal combustion engine 11 by means of the belts 21 extending from the usual radiator fan pulley 22 to a clutch driving member or pulley 23. A clutch connects the driving member 23 with the compressor or driven shaft 24. The clutch is engaged and disengaged by pulling or pushing the knob 25 of the Bowden wire construction 26, which operates the actuator 27 to engage and disengage the compressor as more fully hereinafter described.

The clutch includes the driven shaft 24, and the driving member 23, heretofore referred to, and which is rotatable about and on the same axis as the driven shaft 24. Said driving member 23 has two inwardly directed drive surfaces 27 and 28. A clutch disk 29 is longitudinally movable on and is keyed to the driven shaft 24 at 30 and is engageable with the drive surface 27. A teaser or spread reaction disk 31 is coaxial with said clutch disk 29 and is longitudinally movable on the axis of the driven shaft 24 and is engageable with the other drive surface 28.

Spreader means are provided between the disks 29 and 31, which means is energized by relative rotation of the disks, and when so energized, the friction surfaces 33 and 34 of the disks 29 and 31 respectively engage the drive surfaces 27 and 28. A longitudinal actuator 35 moves the teaser disk 31 longitudinally for the purpose of causing an initial engagement of friction surface 34 with rotating drive surface 28, thus producing initial relative rotation of the disk 31 with respect to the disk 29 to energize the spreader means and thus quickly to engage the driving member or pulley 23 with the compressor 11, and vice versa.

Preferably the teaser disk 31 is mounted on a spring pressed pin 36, which is pushed outwardly by the spring 37 against the actuator 35, which conveniently is in the form of a forwardly sprung lever tending to move towards the front of the automobile because of the inherent spring construction at 40. This causes the lever to move forwardly against the connector 41 of the Bowden wire 42 of the Bowden wire construction 26 heretofore referred to. The pin 36 carries the disk 31 by means of the rings 43 and 44, which maintain a fixed longitudinal relation between the pin 36 and the disk 31.

The spreader means may preferably take the form of a groove and ball construction on the disks 29 and 31. To this end, the disk 31 is provided with cups 45 within which balls 46 are placed. The disk 29 is provided with cups 47 which provide a gradual camming action as relative rotation is produced between the disks 29 and 31.

Preferably the driving member or pulley 23 is rotatable about and has a bearing on the driven shaft 24. This may include a race ball construction 50 wihch is provided with grease sealing means 51, as is well known. The pulley 23 is axially fixed with respect to shaft 24 by the ball-race.

If desired, the clutch may include a counter-balancing weight for any unbalanced weight in the compressor. For example, if there is an unbalanced weight, diagrammatically indicated at 53 within the compressor 11, then a counterbalancing weight 54 may be attached to the clutch disk 29, and this may be sufficient statically to counterbalance the weight 53.

The drive surface 28 conveniently may be formed by a separate disk 55 which is secured to the main body of the pulley 23. This is accomplished by rotationally locking the disk 55 by means of pin 56 and thereafter axially locking the disk 55 by means of the split ring 57 placed in groove 58.

In the operation of my invention, it is assumed that the clutch is in a non-driving condition, as shown in Figure 3. When the user desires to make the air conditioning system effective, the knob 25 is pushed in towards the front of the car, and this moves the actuator 35 in a forward direction, or to the left in Figure 3. The spring pressed pin 36 follows the forward movement of the actuator 35, and carries with it the teaser disk 31. When the friction surface 34 of the teaser disk 31 engages the rotating drive surface 28, the disk 31 has an initial rotation with respect to the disk 29, which tends to remain stationary. This relative rotation between the disks 29 and 31 causes the spreader means or groove and ball construction 45, 46 and 47 to spread the disks apart, so that the friction surfaces 33 and 34 are tightly pressed against the drive surfaces 27 and 28. Under these conditions, the rotating motion of the driving member or pulley 23 is transmitted to the driven shaft 24, which is connected to the compressor 11. This starts the compressor in operation, and provides the desired air conditioning within the car body. Should the user desire to discontinue the air conditioning, he merely pulls the knob 25 towards him, which, in turn, moves the actuator 35 and pin 36 to the right, in Figure 3, and this disengages the disks 29 and 31 from the drive surfaces 27 and 28, and this disconnects the compressor from the internal combustion engine 11. The knob 25 or Bowden wire construction is provided with the usual detent capable of holding the knob 25 in the off position against the spring action of actuator 35.

When the compressor is stationary, all of the compressor parts, and the disks 29 and 31, the pin 36 and actuator 35 remain in a stationary, or non-rotating condition. There are no wearing parts likely to have relative rotation as long as the compressor is disconnected from the internal combustion engine. When the knob 25 is pushed in, to connect the compressor 12 with the internal combustion engine 11, the actuator or lever 35 can move forward, into complete disengagement with the spring pressed pin 36 whose forward movement is stopped when the friction surface 34 engages the drive surface 28. This prevents wear between the pin 36 and lever 35.

While the form of embodiment of the invention as herein disclosed constitutes a preferred form, it is to be understood that other forms might be adopted as may come within the scope of the claims which follow.

What is claimed is as follows:

1. A clutch comprising: a driven shaft; a driving member mounted axially fixed and rotationally free on said driven shaft, said driving member having two inwardly directed drive surfaces; a clutch disk longitudinally movable on keyed to said driven shaft and engageable with one of said drive surfaces; a spring pressed pin longitudinally movable in said driven shaft; a teaser disk carried by said pin and engageable with the other of said drive surfaces; spreader means between said disks energized by relative rotation of said disks; and an actuator for said pin.

2. A clutch comprising: a driven shaft; a driving member mounted axially fixed and rotationally free on said driven shaft, said driving member having two inwardly directed drive surfaces; a clutch disk longitudinally movable on and keyed to said driven shaft and engageable with one of said drive surfaces; a pin longitudinally movable on the axis of said driven shaft; a teaser disk carried by said pin and engageable with the other of said drive surfaces; spreader means between said disks energized by relative rotation of said disks; and an actuator for said pin.

3. A clutch comprising: a driven shaft; a driving member axially fixed and rotatable about and having a bearing on said driven shaft, said driving member having two inwardly directed drive surfaces; a clutch disk longitudinally movable on and keyed to said driven shaft and engageable with one of said drive surfaces; a pin longitudinally movable in said driven shaft; a teaser disk carried by said pin and engageable with the other of said drive surfaces; spreader means between said disks energized by relative rotation of said disks; and an actuator for said pin.

4. A clutch comprising: a driven shaft; a driving member axially fixed and rotatable about and having a bearing on said driven shaft, said driving member having two inwardly directed drive surfaces; a clutch disk longitudinally movable on and keyed to said driven shaft and engageable with one of said drive surfaces; a pin longitudinally movable on the axis of said driven shaft; a teaser disk carried by said pin and engageable with the other of said drive surfaces; spreader means between said disks energized by relative rotation of said disks; and an actuator for said pin.

5. A clutch comprising: a driven shaft; a driving member axially fixed and rotatable about and having a bearing on said driven shaft, said driving member having two inwardly directed drive surfaces; a clutch disk longitudinally movable on and keyed to said driven shaft and engageable with one of said drive surfaces; a teaser disk coaxial with said clutch disk and longitudinally movable on the axis of said driven and engageable with the other of said drive surfaces; spreader means between said disks energized by relative rotation of said disks; and a longitudinal actuator for said teaser disk.

6. A clutch comprising: a driven shaft; a driving member axially fixed and rotatable about and on the same axis as said driven shaft, said driving member having two inwardly directed drive surfaces; a clutch disk longitudinally movable on and keyed to said driven shaft and engageable with one of said drive surfaces; a teaser disk coaxial with said clutch disk and longitudinally movable on the axis of said driven shaft and engageable with the other of said drive surfaces; spreader means between said disks energized by relative rotation of said disks; and a longitudinal actuator for said teaser disk.

7. A clutch comprising: a driven shaft; a driving member axially fixed and rotatable about and on the same axis as said driven shaft, said driving member having two inwardly directed drive surfaces; a clutch disk longitudinally movable on and keyed to said driven shaft and engageable with one of said drive surfaces; a teaser disk coaxial with said clutch disk and longitudinally movable on the axis of said driven shaft and engageable with the other of said drive surfaces; a groove and ball construction between said disks providing spreader means energized by relative rotation of said disks; and a longitudinal actuator for said teaser disk.

8. A clutch comprising: a driven shaft; a driving member axially fixed and rotatable about and on the same axis as said driven shaft, said driving member having two inwardly directed drive surfaces; a clutch disk longitudinally movable on and keyed to said driven shaft and engageable with one of said drive surfaces; a spring pressed pin longitudinally movable in said drive shaft; a teaser disk carried by said pin and engageable with the other of said drive surfaces; spreader means between said disks energized by relative rotation of said disks; and a longitudinal actuator for said spring pressed pin.

9. A clutch comprising: a driven shaft; a driving member axially fixed and rotatable about and on the same axis as said driven shaft, said driving member having two inwardly directed drive surfaces; a clutch disk longitudinally movable on and keyed to said driven shaft and engageable with one of said drive surfaces; a spring pressed pin longitudinally movable in said drive shaft; a teaser disk carried by said pin and engageable with the other of said drive surfaces; spreaders means between said disks energized by relative rotation of said disks; and a longitudinal actuator for said spring pressed pin, said actuator including a lever with an intermediate engagement with the end of said spring pressed pin.

10. A clutch comprising: a driven shaft; a driving member axially fixed and rotatable about and on the same axis as said driven shaft, said driving member having two inwardly directed drive surfaces; a clutch disk longitudinally movable on and keyed to said driven shaft and engageable with one of said drive surfaces; a spring pressed pin longitudianlly movable in said drive shaft; a teaser disk carried by said pin and engageable with the other of said drive surfaces; spreader means between said disks energized by relative rotation of said disks; and a longitudinal actuator for said spring pressed pin, said actuator including a lever with an intermediate engagement with the end of said spring pressed pin; and a Bowden wire transmission connected to said actuator.

References Cited in the file of this patent

UNITED STATES PATENTS

| | | |
|---|---|---|
| 1,288,693 | Schaum | Dec. 24, 1918 |
| 2,375,854 | Lambert | May 15, 1945 |
| 2,387,039 | Parrett | Oct. 16, 1945 |
| 2,649,941 | Doebeli | Aug. 25, 1953 |

FOREIGN PATENTS

| | | |
|---|---|---|
| 599,540 | Great Britain | Mar. 15, 1943 |